United States Patent
Reddy et al.

(10) Patent No.: US 9,783,072 B1
(45) Date of Patent: Oct. 10, 2017

(54) SYSTEM AND METHOD FOR REDUNDANTLY CONTROLLING A DUAL ELECTRIC VEHICLE SUPPLY EQUIPMENT

(71) Applicant: Semaconnect, Inc., Bowie, MD (US)

(72) Inventors: Mahidhar Reddy, Annapolis, MD (US); Rajesh Kumar, Annapolis, MD (US); Vince Kayser, Annapolis, MD (US)

(73) Assignee: SemaConnect Inc., Bowie, MD (US)

( * ) Notice: Subject to any disclaimer, the term of this patent is extended or adjusted under 35 U.S.C. 154(b) by 116 days.

(21) Appl. No.: 14/571,066

(22) Filed: Dec. 15, 2014

(51) Int. Cl.
*H02J 7/00* (2006.01)
*B60L 11/18* (2006.01)

(52) U.S. Cl.
CPC ............... *B60L 11/1816* (2013.01)

(58) Field of Classification Search
CPC .................................... Y02T 90/14
USPC ....................................... 320/109
See application file for complete search history.

(56) References Cited

U.S. PATENT DOCUMENTS

| 4,797,567 | A * | 1/1989 | Pappas | E06B 9/70 160/1 |
|---|---|---|---|---|
| 9,047,075 | B1 * | 6/2015 | Lee | H02J 9/061 |
| 2013/0241485 | A1 * | 9/2013 | Snyder | B60W 20/11 320/109 |
| 2014/0049213 | A1 * | 2/2014 | Bianco | B60L 11/1824 320/109 |
| 2015/0352971 | A1 * | 12/2015 | Bianco | B60L 11/1848 307/9.1 |
| 2016/0121747 | A1 * | 5/2016 | Jefferies | H01H 3/16 320/109 |
| 2016/0137082 | A1 * | 5/2016 | Jefferies | B60L 11/1818 320/109 |
| 2016/0144728 | A1 * | 5/2016 | Harper | B60L 11/1803 320/109 |
| 2016/0176306 | A1 * | 6/2016 | Outwater | B60L 11/1825 320/138 |

* cited by examiner

*Primary Examiner* — Suresh Memula
(74) *Attorney, Agent, or Firm* — Vector IP Law Group; Robert S. Babayi

(57) ABSTRACT

A system and method is provided for creating a redundantly controlled dual electric vehicle supply equipment (EVSE). A double pole, double throw (DPDT) AC relay is provided on a power input to a low-voltage direct current (LVDC) circuit. The DPDT AC relay switches the AC power to the LVDC circuit automatically from either a LEFT ACV input or RIGHT ACV input such that operation of LVDC circuit remains uninterrupted.

17 Claims, 7 Drawing Sheets

SYSTEM AND METHOD FOR REDUNDANTLY CONTROLLING A DUAL ELECTRIC VEHICLE SUPPLY EQUIPMENT

TECHNICAL FIELD

The present disclosure relates to the field of dual electric vehicle supply equipments (EVSEs). More specifically, the present disclosure relates to deriving low-voltage direct current (LVDC) to create a redundantly controlled dual EVSE.

BACKGROUND

An electric vehicle supply equipment (EVSE) supplies electric energy for charging/recharging of electric vehicles plugged into the EVSE. A dual EVSE includes two alternating current (AC) charging circuits that supply two independent charging AC voltages to two separate electric vehicles. For the dual EVSE, a low-voltage direct current (LVDC) circuit that powers electronic components of the dual EVSE is common to the two AC charging circuits. Generally, the LVDC is derived from an incoming AC voltage to the dual EVSE (i.e., incoming AC voltage via one of the two ACV inputs to the dual EVSE). So, when AC power/voltage is removed from the ACV input that is supplying the AC power to the LVDC circuit, the dual EVSE appears to be completely shut down (i.e., both the AC charging circuits will be non-functional) even though only one of the ACV inputs has lost the AC power. In addition, service personnel may assume that the dual EVSE is completely shut down because the user interface controlled by the LVDC circuit is shut down, while AC power may still be present on the other ACV input that is not supplying the AC power to the LVDC circuit. This creates a potential safety hazard for the service personnel.

As such, what is needed is a way to power the LVDC circuit by either one of the ACV inputs in a mutually exclusive manner, thus creating a redundantly controlled dual EVSE.

These and other drawbacks exist.

BRIEF SUMMARY

Various systems and methods for creating a redundantly controlled dual electric vehicle supply equipment (EVSE) are described herein.

According to one aspect of the present disclosure, the dual EVSE includes a first alternating current (AC) charging circuit configured to receive AC power from a first AC voltage input. In some implementations, the dual EVSE includes a second AC charging circuit configured to receive AC power from a second AC voltage input. In some implementations, the dual EVSE includes a low-voltage direct current (LVDC) circuit configured to provide LVDC to one or more control circuits of the dual EVSE, wherein the LVDC is derived from the AC power associated with either the first AC voltage input or the second ACV input. In some implementations, the dual EVSE further includes a double pole, double throw (DPDT) AC relay provided at an input of the LVDC circuit, wherein the DPDT AC relay is configured to switch the AC power to the LVDC circuit from either the first AC voltage input or the second ACV input.

According to one aspect of the present disclosure, a method for creating a redundantly controlled dual EVSE may include a plurality of operations. In some implementations, the operations may include providing a first alternating current (AC) power from a first AC voltage input to a low-voltage direct current (LVDC) circuit. In some implementations, the operations may include sensing a loss of the first AC power from the first AC voltage input. In some implementations, the operations may further include in response to the sensing, providing a second AC power from a second AC voltage input to the LVDC circuit.

According to one aspect of the present disclosure, the dual EVSE includes a low-voltage direct current (LVDC) circuit configured to receive a first alternating current (AC) power from a first AC voltage input. In some implementations, the dual EVSE includes a double pole, double throw (DPDT) AC relay that is configured to: sense a loss of the first AC power from the first AC voltage input, and provide a second AC power from a second AC voltage input to the LVDC circuit in response to the loss of the first AC power.

BRIEF DESCRIPTION OF THE DRAWINGS

Aspects of the present disclosure are illustrated by way of example and are not limited by the accompanying figures with like references indicating like elements.

DETAILED DESCRIPTION

Figure 1:
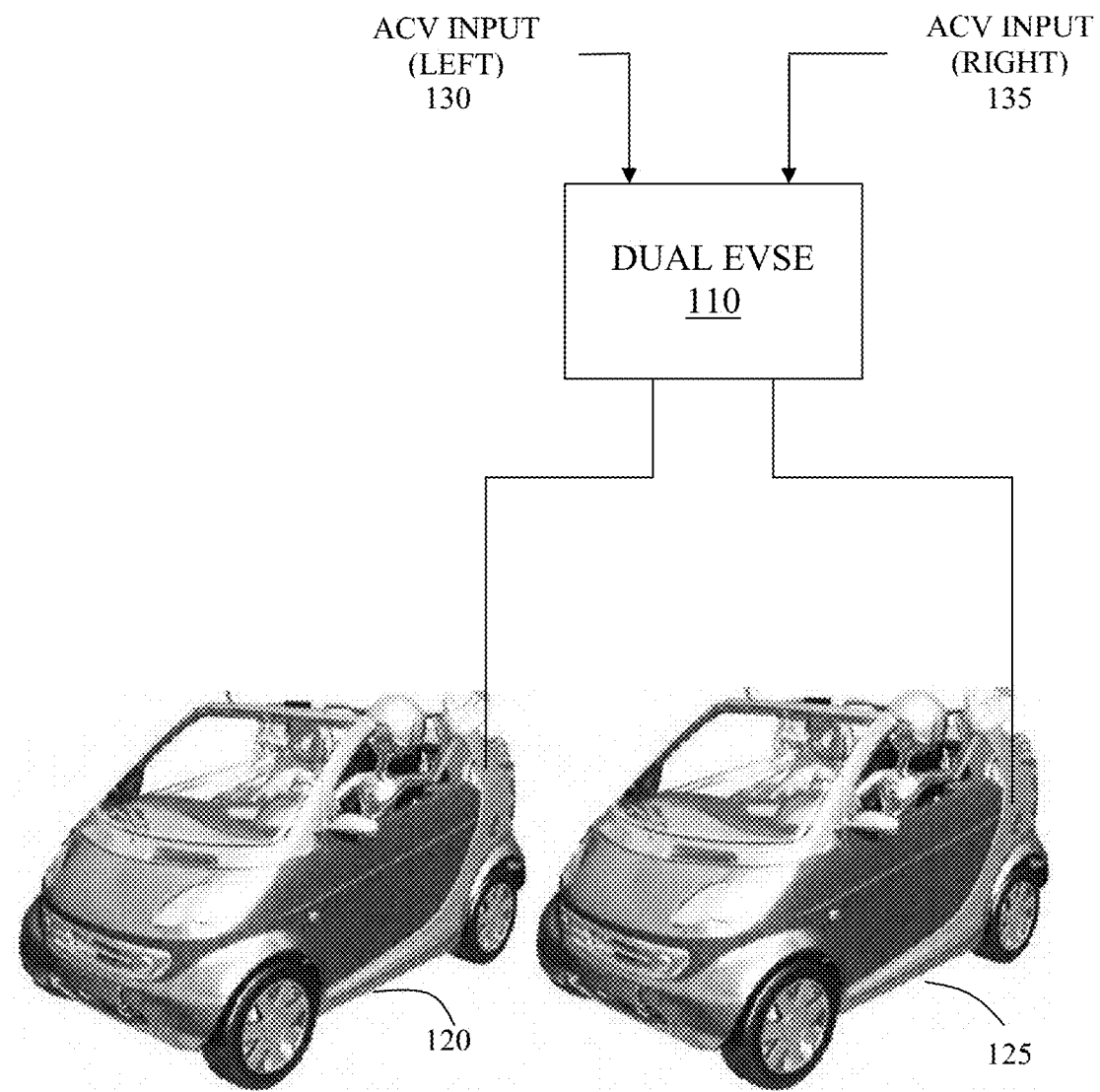
FIG. 1 illustrates an exemplary dual electric vehicle supply equipment (EVSE) providing charging voltages to two electric vehicles, according to various aspects of the invention.

FIG. 1 illustrates an exemplary dual electric vehicle supply equipment (EVSE) 110, according to various aspects of the invention. Dual EVSE 110 supplies two independent charging alternating current (AC) voltages to two separate electric vehicles 120, 125. ACV inputs 130, 135 to the dual EVSE 110 are independent of each other and provide AC charging power for the two separate electric vehicles 120, 125.

Figure 2:
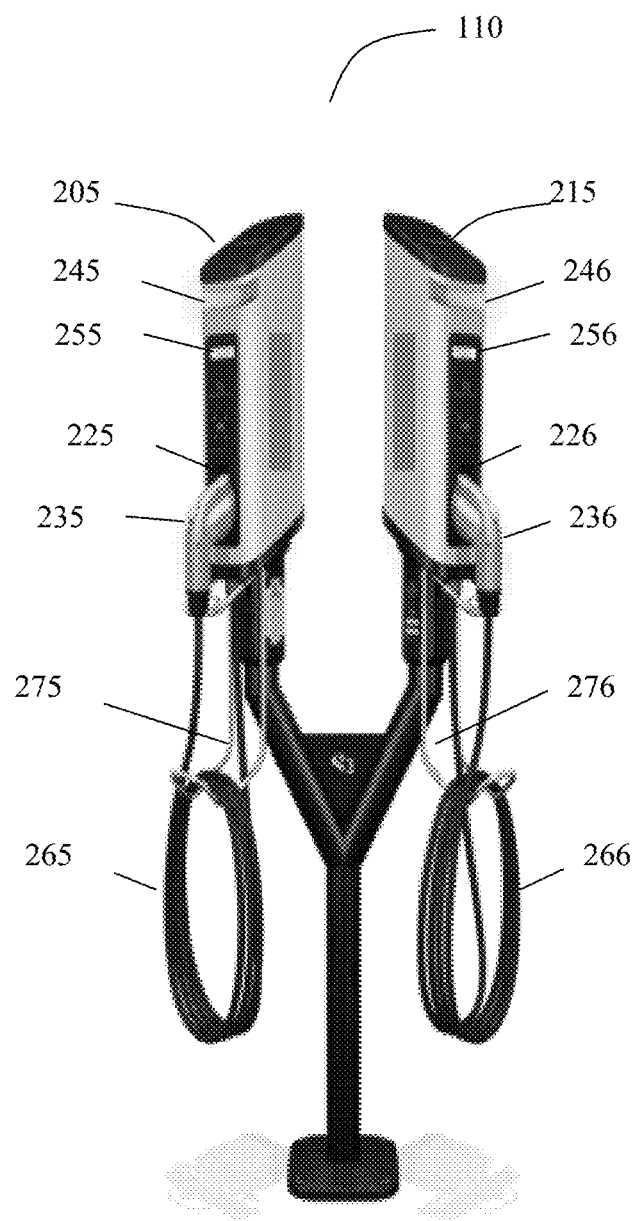
FIG. 2 illustrates an exemplary dual EVSE, according to various aspects of the invention.

In some implementations, dual EVSE 110 (as depicted in FIG. 2) may include two charging stations 205, 215 each including an opening 225, 226 that accepts a J1772 plug 235, 236 that is capable of charging electric and plug-in hybrid electric vehicles 120, 125. ACV input 130 supplies AC power to charging station 205 and ACV input 135 supplies AC power to charging station 215. Each charging station 205, 215 includes LED (light emitting diode) lights 245, 246, a display 255, 256 (for example, liquid crystal display or other display), a speaker, and a cord 265, 266 of a particular length that ensures easy charging access over and around the electric vehicle. In some implementations, the cord length may be 18 feet, though other cord lengths may be used without departing from the scope of the invention. In some implementations, cord 265, 266 may include one or more cables used to supply electric energy for charging/recharging of electric vehicles plugged into the dual EVSE 110.

In some implementations, each charging station 205, 215 may further include a bracket 275, 276 for coiling/storing cord 265, 266 after a charging session (i.e., after charging of a corresponding vehicle 120, 125). In some implementations, the bracket 275, 276 may be formed of stainless steel, though other materials may be used without departing from the scope of the invention.

Figure 3:
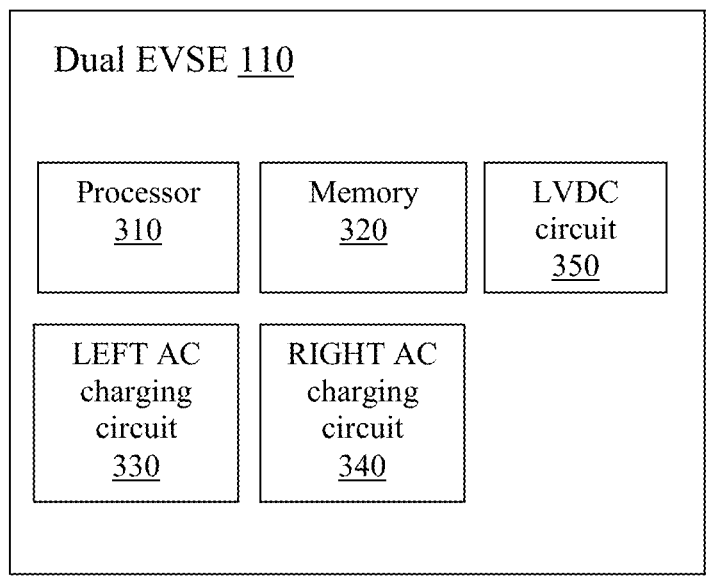
FIG. 3 illustrates components of an enclosure of the dual EVSE, according to various aspects of the invention.

In some implementations, as depicted in FIG. 3, an enclosure of dual EVSE 110 may include a processor 310, a memory 320, a LEFT AC charging circuit 330, a RIGHT AC charging circuit 340, a low-voltage direct current (LVDC) circuit 350, and/or other components that facilitate the functions of dual EVSE 110. In some implementations, processor 310 includes one or more processors, microprocessors, or microcontrollers configured to perform various functions of the dual EVSE 110. In some implementations, memory 320 includes one or more tangible (i.e., non-transitory) computer readable media. Memory 320 may include one or more instructions that when executed by processor 310 cause processor 310 to perform various functions of the dual EVSE 110.

In some implementations, dual EVSE 110 includes two AC charging circuits 330, 340 to independently charge two separate electric vehicles 120, 125. The two AC charging circuits 330, 340 are configured to receive AC power from corresponding ACV inputs 130, 135. The two AC charging circuits are designated as LEFT AC charging circuit 330 and RIGHT AC charging circuit 340 corresponding to the LEFT charging station 205 and the RIGHT charging station 215 of the dual EVSE 110, however, this designation is merely exemplary. The LEFT AC charging circuit 330 provides AC charging power for the electric vehicle 120 connected to (plugged into) the LEFT charging station 205 of the dual EVSE 110 and the RIGHT AC charging circuit 340 provides AC charging power to the electric vehicle 125 connected to (plugged into) the RIGHT charging station 215 of the dual EVSE 110.

Dual EVSE 110 includes various electronic components that are powered by LVDC circuit 350. In other words, various electronic components of the dual EVSE 110 are powered by LVDC provided by LVDC circuit 350. The electronic components powered by LVDC circuit 350 include processor 310, LED lights 245, 246, display 255, 256 that includes a user interface, one or more communication devices, one or more control circuits (not otherwise illustrated in the FIGS.), and/or other electronic components. The user interface provides a user with information regarding the state of the vehicle charge session. The control circuits control the delivery of AC voltage to the electric vehicles 120, 125 connected to the LEFT and RIGHT charging stations 205, 215. The LVDC circuit 350 that powers these electronic components is common to the LEFT and RIGHT charging stations 205, 215 (and/or LEFT and RIGHT AC charging circuits 330, 340) of the dual EVSE 110.

In some implementations, LVDC is derived from one of the ACV inputs 130, 135 to the dual EVSE 110 (i.e., LVDC is derived from AC power/AC voltage from one of the ACV inputs 130, 135). Since there are two ACV inputs, either the LEFT ACV input 130 or the RIGHT ACV input 135 can derive power for LVDC circuit 350, but not simultaneously. Also, the ACV inputs cannot be connected together because they are separately fused by independent external circuit breakers.

Figure 4:
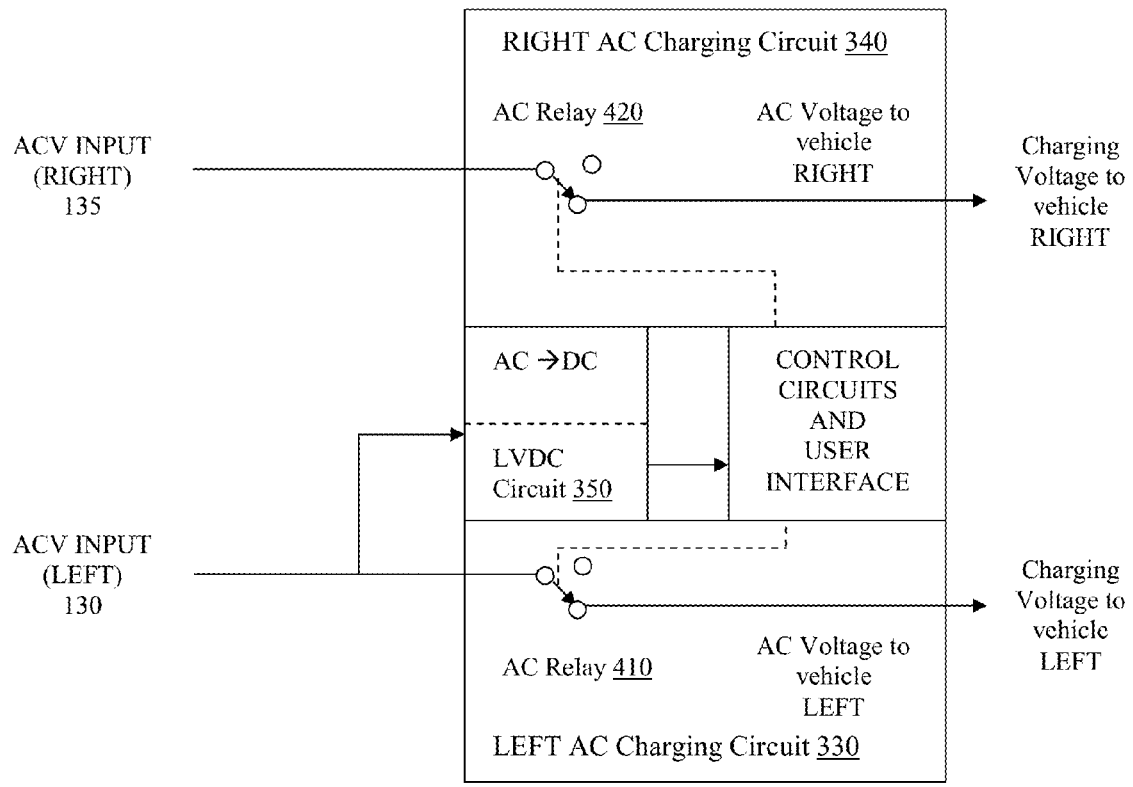
FIG. 4 illustrates an exemplary schematic of alternating current (AC) charging circuits and low-voltage direct current (LVDC) circuit, according to various aspects of the invention.

For example, FIG. 4 depicts LVDC being derived from LEFT ACV input 130. FIG. 4 is an exemplary schematic of the AC charging circuits 330, 340 and LVDC circuit 350 of the dual EVSE 110. Generally, when two vehicles are being charged at the dual EVSE 110, AC power is supplied to the LEFT and RIGHT charging stations 205, 215 (or LEFT and RIGHT AC charging circuits 330, 340) via ACV inputs 130, 135. The LEFT and RIGHT AC charging circuits 330, 340 associated with the LEFT and RIGHT charging stations 205, 215 deliver AC charging voltage to the connected electric vehicles 120, 125. LVDC circuit 350 that is common to the LEFT and RIGHT charging stations 205, 215 (or LEFT and RIGHT charging circuits 330, 340) is powered by AC power from the LEFT ACV input 130. LVDC circuit 350 powers the control circuits that control the delivery of AC charging voltage to both the electric vehicles 120, 125 via the AC charging circuits 330, 340. Each AC charging circuit 330, 340 includes an AC relay 410, 420 that is controlled (i.e., switched) by the control circuits. LVDC circuit 350 powers the control circuits that operate the AC relays 410, 420 to control the delivery of the AC charging voltage to the electric vehicles 120, 125. LVDC circuit 350 further powers the user interface (i.e., display 255, 256) associated with the LEFT and RIGHT charging stations 205, 215. FIG. 4 depicts charging voltage being provided to both the electric vehicles 120, 125 via the LEFT and RIGHT AC charging circuits 330, 340 with corresponding AC relays 410, 420 in a closed position.

When AC power/AC voltage from the LEFT ACV input 130 is removed, the dual EVSE 110 appears to be shut down (i.e., the LEFT and the RIGHT charging stations 205, 215 of the dual EVSE 110 will appear to be non-functional) because no AC power is being provided to the LVDC circuit 350. In other words, the control circuits, user interface, and/or other electronic components of the dual EVSE 110 will appear to be non-functional because of no LVDC. When AC power is removed from the LEFT ACV input 130, LVDC is not provided to the control circuits, which causes 1) the AC relays 410, 420 to switch to an open position and 2) the charging of the electric vehicles 120, 125 to be interrupted.

This creates a problem because the RIGHT charging station 215 loses power even though AC power from only the LEFT ACV input 130 was removed. The problem is further complicated because AC voltage may still be present at the RIGHT charging station 215, even though the user interface is no longer providing the user with information as the LVDC has been removed. Besides making the dual EVSE 110 totally non-functional, even though only the LEFT ACV input 130 is removed, safety of service personnel may also be compromised. The service personnel may assume that the dual EVSE 110 is completely shut down because the LVDC-controlled user interface is shut down, while AC power may still be present on the RIGHT ACV input 135.

In some implementations, when AC power from the LEFT ACV input 130 is removed, the LVDC circuit 350 may be provided with AC power from the RIGHT ACV input 135. In other words, the AC power is automatically switched from either the LEFT ACV input 130 or the RIGHT ACV input 135 to derive the LVDC. Thus, operation of the LVDC circuit 350 which provides LVDC to the electronic components of the dual EVSE 110 is not interrupted when AC power is removed from either the LEFT ACV input 130 or the RIGHT ACV input 135. If electric vehicle 120 is charging at the LEFT charging station 205 and AC power is removed from the RIGHT ACV input 135, the charging is not interrupted at the LEFT charging station 205. Similarly, if electric vehicle 125 is charging at the RIGHT charging station 215 and AC power is removed from the LEFT ACV input 130, the charging is not interrupted at the RIGHT charging station 215.

Figure 5:
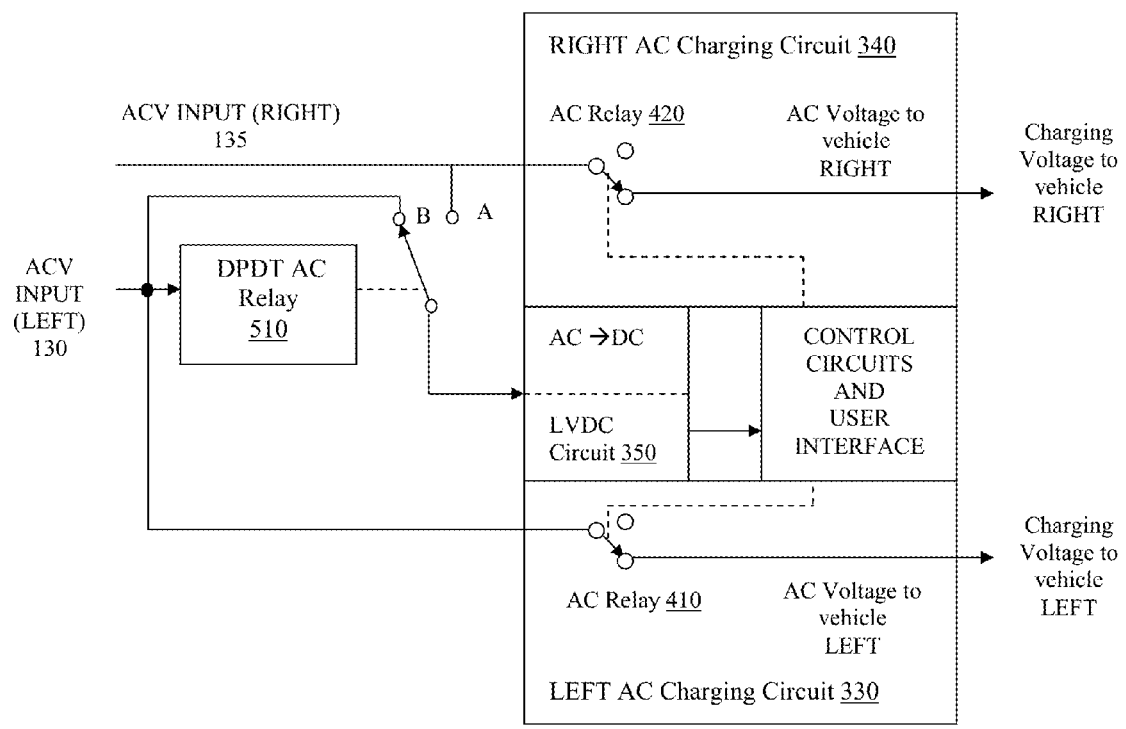
FIG. 5 illustrates an exemplary schematic of the AC charging circuits and the LVDC circuit with a double pole, double throw (DPDT) AC relay, according to various aspects of the invention.

In some implementations, as depicted in FIG. 5, a double pole, double throw (DPDT) AC-powered relay 510 is provided at the power input to the LVDC circuit 350. AC power from the LEFT AC input 130 operates the DPDT AC relay 510 in a normally closed condition. In this condition, DPDT AC relay 510 switches the AC power from the LEFT AC input 130 to the input of the LVDC circuit 350, causing the LVDC to operate the control circuits and user interface of the dual EVSE 110. When AC power is removed from the LEFT ACV input 130, the DPDT AC relay 510 switches to an open condition. In this condition, DPDT AC relay 510 switches the AC power from the RIGHT AC input 135 to the input of the LVDC circuit 350, thus ensuring that the control circuits and the user interface do not lose power.

Figure 6:
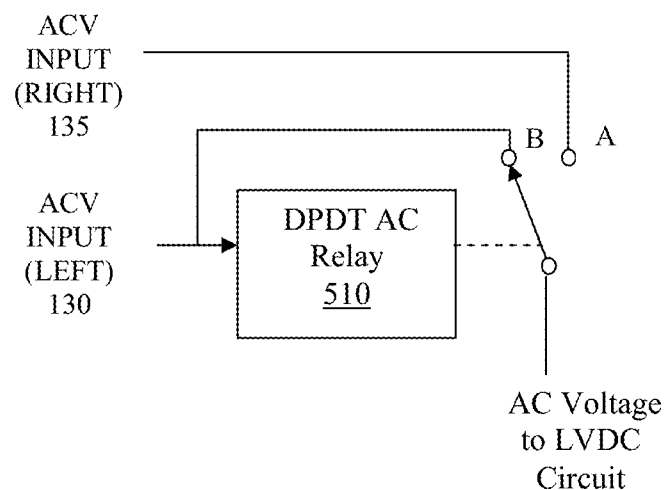
FIG. 6 depicts the DPDT AC relay in a closed condition, according to various aspects of the invention.
Figure 7:
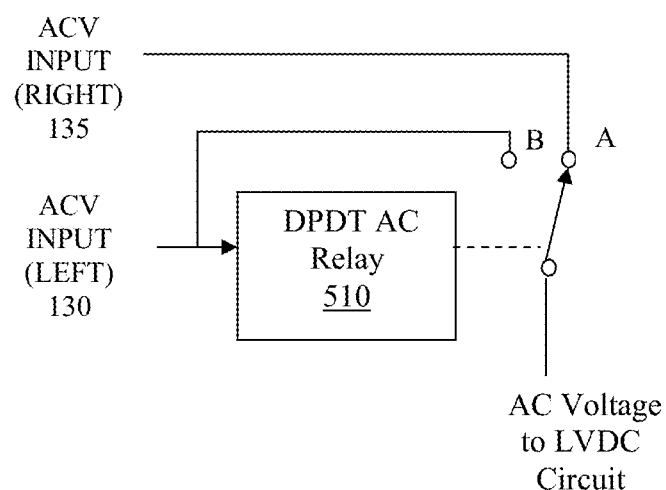
FIG. 7 depicts the DPDT AC relay in an open condition, according to various aspects of the invention.

FIG. 6 illustrates the DPDT AC relay 510 in the closed condition. When AC power at LEFT ACV input 130 is present, the DPDT AC relay 510 operates and AC power is provided from the LEFT ACV input 130 to the input of the LVDC circuit 350 through the B contact. When AC power from the LEFT ACV input 130 is removed, the DPDT AC relay 510 opens (as shown in FIG. 7) and the AC power is provided to the LVDC circuit 350 through the A contact (i.e., from the RIGHT ACV input 135). Thus, the LVDC circuit 350 is powered by AC power from either the LEFT or RIGTH ACV input 130, 135 in a mutually exclusive manner, thereby creating a redundantly controlled dual EVSE 110.

Further, the time for the DPDT AC relay 510 to switch between the LEFT and RIGHT ACV inputs 130, 135 is less time that the LVDC hold time. LVDC hold time is defined as the maximum time that an ACV input can be removed without the LVDC output going to zero. For example, switch time of DPDT AC relay 510 may be 20 milliseconds and LVDC hold time is 50 milliseconds, guaranteeing no disruption in operation of the dual EVSE 110.

In addition to ensuring that the operation of the dual EVSE 110 is not interrupted, safety of the service personnel is also guaranteed by ensuring that the service personnel will not accidently work on a partially powered dual EVSE 110. Both ACV inputs 130, 135 must be removed to remove power from the LVDC circuit 350 and thus the control circuits and user interfaces of the dual EVSE.

Figure 8:
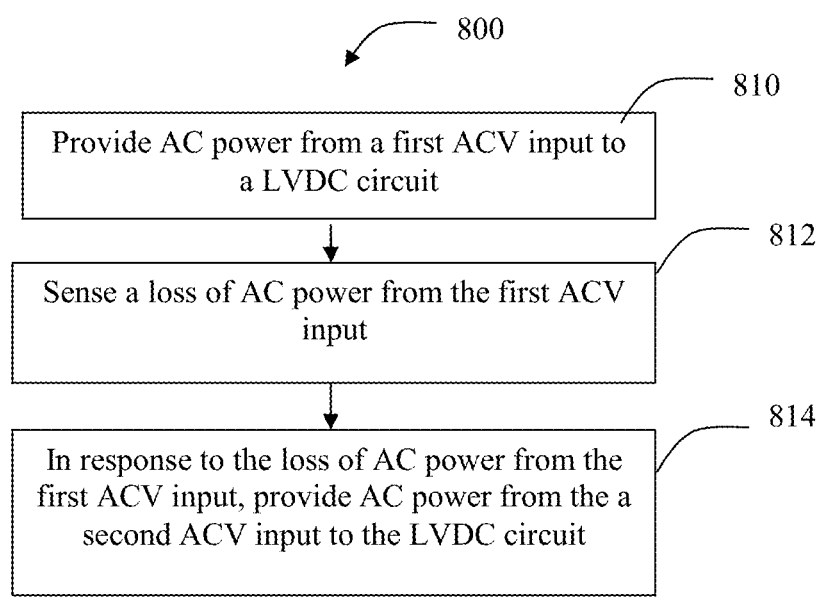
FIG. 8 illustrates a flowchart depicting example operations performed by the dual EVSE, according to various aspects of the invention.

FIG. 8 is a flowchart 800 depicting example operations performed by the dual EVSE 110, according to various aspects of the invention. In some implementations, the described operations may be accomplished using one or more of the modules/components described herein. In some implementations, various operations may be performed in different sequences. In other implementations, additional operations may be performed along with some or all of the operations shown in FIG. 8. In yet other implementations, one or more operations may be performed simultaneously. In yet other implementations, one or more operations may not be performed. Accordingly, the operations described are exemplary in nature and, as such, should not be viewed as limiting.

In an operation 810, process 800 may provide AC power from a first ACV input (for example, LEFT ACV input 130) to LVDC circuit 350. The LVDC circuit 350 may derive LVDC from the first ACV input and provide the LVDC to one or more control circuits of the dual EVSE 110. The one or more control circuits are configured to control the delivery of AC charging voltage to two electric vehicles connected to the dual EVSE 110.

In an operation 812, process 800 may sense a loss of AC power from the first ACV input. In response to the loss of AC power, process 800 may provide AC power from a second ACV input (for example, RIGHT ACV input 135) to LVDC circuit 350, in an operation 814. In other words, the AC power is automatically switched from the first ACV input to the RIGHT ACV input to derive the LVDC such that operation of the LVDC circuit 350 and charging of the electric vehicles is not interrupted.

Implementations of the invention may be made in hardware, firmware, software, or various combinations thereof. The invention may also be implemented as computer-readable instructions stored on a tangible computer-readable storage medium which may be read and executed by one or more processors. A computer-readable storage medium may include various mechanisms for storing information in a form readable by a computing device. For example, a tangible computer-readable storage medium may include optical storage media, flash memory devices, and/or other storage mediums. Further, firmware, software, routines, or instructions may be described in the above disclosure in terms of specific exemplary aspects and implementations of the invention and performing certain actions. However, it will be apparent that such descriptions are merely for convenience, and that such actions may in fact result from computing devices, processors, controllers, or other devices executing firmware, software, routines or instructions.

Other embodiments, uses and advantages of the invention will be apparent to those skilled in the art from consideration of the specification and practice of the invention disclosed herein. The specification should be considered exemplary only, and the scope of the invention is accordingly intended to be limited only by the following claims.

What is claimed is:

1. A dual electric vehicle supply equipment (EVSE) comprising:
   a first alternating current (AC) charging circuit configured to receive AC power from a first AC voltage (ACV) input;
   a second AC charging circuit configured to receive AC power from a second ACV input;
   a low-voltage direct current (LVDC) circuit configured to provide LVDC to one or more control circuits of the dual EVSE, wherein the LVDC is derived from the AC power associated with either the first ACV input or the second ACV input; and
   a double pole, double throw (DPDT) AC relay provided at an input of the LVDC circuit, wherein the DPDT AC relay is configured to switch the AC power to the LVDC circuit from either the first ACV input or the second ACV input.

2. The dual EVSE of claim 1, wherein the first AC charging circuit is configured to provide a first charging voltage to a first vehicle connected to the dual EVSE.

3. The dual EVSE of claim 2, wherein the second AC charging circuit is configured to provide a second charging voltage to a second vehicle connected to the dual EVSE.

4. The dual EVSE of claim 3, wherein the one or more control circuits are configured to control delivery of the first charging voltage to the first vehicle and the second charging voltage to the second vehicle.

5. The dual EVSE of claim 1, wherein the LVDC circuit is configured to provide LVDC to at least one display associated with the dual EVSE.

6. The dual EVSE of claim 1, wherein the first AC charging circuit comprises a first AC relay that is controlled by the one or more control circuits.

7. The dual EVSE of claim 6, wherein the second AC charging circuit comprises a second AC relay that is controlled by the one or more control circuits.

8. A method for creating a redundantly controlled dual electric vehicle supply equipment (EVSE), the method comprising:
provproviding a first alternating current (AC) power from a first AC voltage input to a low-voltage direct current (LVDC) circuit;
sensing a loss of the first AC power from the first AC voltage input; and
in response to sensing the loss, providing a second AC power from a second AC voltage input to the LVDC circuit, wherein LVDC provided by the LVDC circuit is derived from either the first AC power or the second AC power and wherein the LVDC is provided to one or more control circuits of the redundantly controlled dual EVSE.

9. The method of claim 8, further comprising:
switching from the first AC power to the second AC power such that operation of the LVDC circuit remains uninterrupted.

10. A dual electric vehicle supply equipment (EVSE) comprising:
a low-voltage direct current (LVDC) circuit configured to receive a first alternating current (AC) power from a first AC voltage input; and
a double pole, double throw (DPDT) AC relay configured to:
sense a loss of the first AC power from the first AC voltage input, and
provide a second AC power from a second AC voltage input to the LVDC circuit in response to the loss of the first AC power, wherein the LVDC circuit is configured to provide LVDC to one or more control circuits of the dual EVSE.

11. The dual EVSE of claim 10, further comprising:
a first AC charging circuit configured to receive the first AC power from the first AC voltage input.

12. The dual EVSE of claim 11, wherein the first AC charging circuit is configured to provide a first charging voltage to a first vehicle connected to the dual EVSE.

13. The dual EVSE of claim 10, further comprising:
a second AC charging circuit configured to receive the second AC power from the second AC voltage input.

14. The dual EVSE of claim 13, wherein the second AC charging circuit is configured to provide a second charging voltage to a second vehicle connected to the dual EVSE.

15. The dual EVSE of claim 12, wherein the one or more control circuits are configured to control delivery of a first charging voltage to a first vehicle connected to the dual EVSE and a second charging voltage to a second vehicle connected to the dual EVSE.

16. The dual EVSE of claim 12, wherein the LVDC is derived from the first AC power prior to sensing the loss of the first AC power and from the second AC power when the second AC power is provided to the LVDC circuit.

17. The dual EVSE of claim 10, wherein the DPDT AC relay is configured to switch from the first AC power to the second AC power such that operation of the LVDC circuit remains uninterrupted.

* * * * *